United States Patent
Galvin et al.

(10) Patent No.: US 7,827,290 B2
(45) Date of Patent: Nov. 2, 2010

(54) METHOD FOR INTEGRATING CLIENT WEB HISTORY AND CALL CENTER HISTORY INTO A SINGLE INTERACTION HISTORY ACCESSIBLE IN REAL TIME

(75) Inventors: Brian Galvin, Albuquerque, NM (US); S. Michael Perlmutter, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 40 days.

(21) Appl. No.: 11/614,601

(22) Filed: Dec. 21, 2006

(65) Prior Publication Data
US 2008/0154933 A1    Jun. 26, 2008

(51) Int. Cl.
*G06F 15/16* (2006.01)
(52) U.S. Cl. ..................... 709/228; 709/218
(58) Field of Classification Search ......... 709/201–207, 709/217–219, 223–229; 707/1–4, 8, 10, 707/100, 104
See application file for complete search history.

(56) References Cited

U.S. PATENT DOCUMENTS

| | | | |
|---|---|---|---|
| 6,477,533 B2 * | 11/2002 | Schiff et al. .................. 707/10 |
| 6,822,945 B2 * | 11/2004 | Petrovykh .................... 370/270 |
| 2002/0114441 A1 * | 8/2002 | Coussement ........... 379/265.06 |
| 2002/0143861 A1 * | 10/2002 | Greene et al. ............... 709/203 |
| 2005/0010567 A1 * | 1/2005 | Barth et al. .................... 707/3 |
| 2007/0060099 A1 * | 3/2007 | Ramer et al. ................ 455/405 |
| 2007/0061421 A1 * | 3/2007 | Karidi ........................ 709/218 |
| 2007/0133780 A1 * | 6/2007 | Berner et al. .......... 379/265.01 |
| 2007/0255702 A1 * | 11/2007 | Orme ............................ 707/5 |
| 2007/0294096 A1 * | 12/2007 | Randall et al. ................. 705/1 |

* cited by examiner

*Primary Examiner*—Yasin Barqadle
(74) *Attorney, Agent, or Firm*—Central Coast Patent Agency, Inc.

(57) ABSTRACT

A method is provided for creating a portable history data record for a customer by integrating Web cookie data and telephone history data. The method includes the acts (a) retrieving and interpreting the Web cookie data, (b) retrieving and interpreting the telephone history data, (c) combining the data sets into a single data record eliminating redundant data, (d) formatting the data record for human or for machine interpretation, and (e) presenting the formatted data record to a point of service during or just ahead of an associated interaction event.

14 Claims, 5 Drawing Sheets

METHOD FOR INTEGRATING CLIENT WEB HISTORY AND CALL CENTER HISTORY INTO A SINGLE INTERACTION HISTORY ACCESSIBLE IN REAL TIME

CROSS-REFERENCE TO RELATED APPLICATIONS

NA

BACKGROUND OF THE INVENTION

1. Field of the Invention

The present invention is in the field of network communication and transacting and pertains particularly to call transaction history and Web transaction history management.

2. Discussion of the State of the Art

The World Wide Web (WWW) also referred to as the Internet has become a major tool for conducting business. Customer service is essential to any good customer/business relationship and a critical piece of customer service is understating the customer and what the customer wants in products and services. Companies today conduct much of their business online through Web sites that offer a wide range of interactions and services. Many of these same companies are also accessible through the telephone network via call centers where live agents and automated systems are available to process orders and assist with customer service needs. More recently, some services have developed technologies that enable a combination of telephone assistance and Web assistance for clients who are dually connected to the company through those respective mediums.

More often though, clients of companies will access services and place orders through the Web, or via the telephone. On the Internet, the company may track browsing behavior of clients through the use of Web cookies. Web cookies are simple machine readable text files that are generated in a server and exchanged between a customer's computer and the server when the customer accesses the server over the network. Web cookies may be temporary (deleted after a session), or they may be persistent (having an expiration date).

A web cookie or a series of cookies can be used to identify and track where a customer has been at a Web site, for example, what resources the customer clicked on to view or download. Likewise, cookies may be used to track customer history at the site including transaction history. Therefore, when the customer logs on to the site, the server receives a cookie back from the customer's machine, the cookie providing the desired information about the customer at the point and time of access. If the customer creates new history at the site, then the server updates the cookie and may send it back to the customer sometime before the end of the session. Every time the customer accesses the site, the most recent cookie is available to give the site information about the customer.

In telephony, customers are identified by one or more telephony protocols like caller line identification service (CLIS) and then checked against a customer account database to access any history if the caller has done business with the company before. If the caller is new, then a new account may be created for the caller. Typically, caller history is added to the account history for the caller after the caller has been serviced and that history may be searched and updated periodically as the caller continues to business with the company.

One problem with the separate approaches for tracking history for companies that maintain both Web interfaces and telephony interfaces is that when the customer accesses services through the Web, the telephony account history is not readily available to the Web server. Likewise, when the customer accesses services over the telephone, the customer's Web history is not immediately available.

Therefore, what is needed are methods and a system that can integrate Web and telephone account histories and provide the service point with complete customer information about past interactions with the company over both mediums while the customer is conducting a business session with the company.

SUMMARY OF THE INVENTION

According to one aspect of the present invention, a method is provided for creating a portable history data record for a customer by integrating Web cookie data and telephone history data. The method includes the acts, (a) retrieving and interpreting the Web cookie data, (b) retrieving and interpreting the telephone history data, (c) combining the data sets into a single data record eliminating redundant data, (d) formatting the data record for human or for machine interpretation, and (e) presenting the formatted data record to a point of service during or just ahead of an associated interaction event.

In one aspect, in act (a), the cookie data is retrieved from a third party service maintaining a data repository where the cookie was replicated to. In a variation of this aspect, the Web cookie data includes multiple web cookies. In one aspect, in act (a), a cookie reader parses and interprets the Web cookie data. In one aspect, in act (b), the telephone history data is retrieved from a third party service maintaining a data repository where the telephone history data was replicated to. In a variation of this aspect, the telephone history data is of the form of one or more than one telephone cookie. In one aspect, a cookie reader parses and interprets the telephone history data.

In one aspect, in act (c), combining the data sets is performed by a third-party server running software adapted to retrieve and combine the data sets upon request from a routing system.

In still another aspect of the present invention, a system is provided for correlating recorded information about a customer, the information recorded at separate times and at disparate system interfaces of a service organization. The system includes a data server connected to a data network, the data server accessible to the disparate system interfaces, at least one data repository accessible to the data server, and an instance of software installed and executable on the data server. The system is characterized in that text data descriptive of activities performed by the customer at either of the disparate system interfaces is replicated to the data server and stored in the at least one repository managed by the software instance and where upon request, the instance of software looks for data stored and if data is found, combines the data into one data record void of redundant or repeated data.

In one embodiment, the disparate interfaces include a telephony interface and a Web interface. Also in one embodiment, the data server is a proxy server adapted to broker Web connections between customers and other Web servers. In one embodiment, the text data describing activities performed by the customer is recorded as one or more Web cookie files or as one or more telephone cookie files depending on the nature of the interface that hosted the activities.

According to another aspect of the invention, a routing system is provided for routing a data record about a customer to a service interface of a service organization. The routing system includes a data server connected to the service organization network, the data server accessible to the service interface, at least one data repository accessible to the data server, and an instance of software installed and executable on the data server. The data record is generated by the software instance and contains Web interaction history data and telephone interaction history data of the customer previously recorded as one or more cookie files at disparate service access points of the organization, the record forwarded to the service interface selected in routing of a new interaction event that the customer is party to, the record rendered useable at the interface.

In one aspect the data record is a cookie file created from separate cookie files. In another aspect, the service organization network includes an Internet network and Web interface and a telephone network and a telephone interface. In a variation of this embodiment of the method, the data server is a proxy server functioning as a first routing point for the record to the service interface. Also in this embodiment, the service interface is one of a Web interface or a telephony interface.

In one embodiment, the record is machine readable. In another embodiment, the record is human readable and displayable on a PC screen. In one embodiment, the routed record arrives at the service interface prior to the arrival of an associated pending interaction event routed to the interface.

BRIEF DESCRIPTION OF THE DRAWING FIGURES

DETAILED DESCRIPTION

Figure 1:
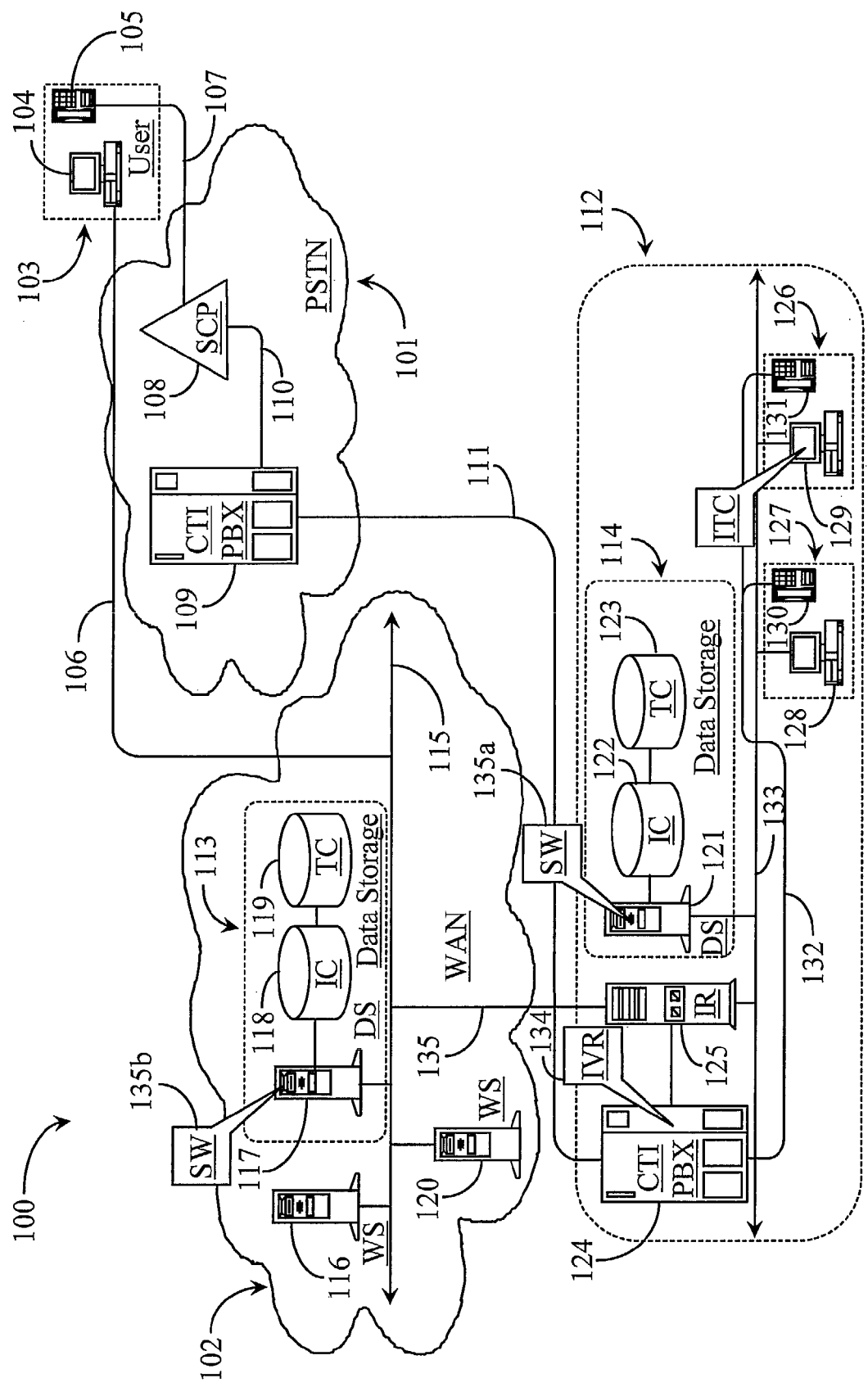
FIG. 1 is an architectural overview of a network environment supporting a system for integrating telephone and Web history information according to an embodiment of the present invention.

FIG. 1 is an architectural overview of a network environment 100 supporting a system for integrating telephone and Web history information according to an embodiment of the present invention. Network environment 100 includes a public switched telephony network (PSTN) 101 and wide-area-network (WAN) 102. PSTN 101 may instead be a private telephone rather than a public network without departing from the spirit and scope of the present invention. Likewise, other telephone network segments may be included herein without departing from the spirit and scope of the invention such as a wireless cellular network for example.

WAN 102 may be the Internet network in one embodiment, and may hereinafter be referred to as Internet 102. WAN 102 may also be a private network or a corporate network without departing from the spirit and scope of the present invention. Other data network segments may also be included in this example like a wireless municipal area network (MAN), or a local area network (LAN) connected to a WAN without departing from the scope or spirit of the invention. The networks illustrated in this example are preferred by the inventor because of their wide availability to the public.

Network environment 100 also includes a call center 112. Call center 112 may be that hosted by a company offering services to customers through telephone network (PSTN) 101 and through Internet 102. In this example, the system of the invention applies to a company having both a telephone network presence and a Web presence. However that is not specifically required in order to practice the present invention in one embodiment that will be described later in this specification.

Call center 112 has a LAN 133 provided therein and adapted to enable internal networking and network access to Internet network 102. Customers may access center 112 via Internet network 102. Call center 112 has a computer telephony integrated (CTI) private branch exchange (PBX) telephone switch 124 provided therein and adapted to enable access to PSTN network 101. Customers may access center 112 through PSTN 101.

A user location 103 is illustrated in this example. User location 103 includes a user operated personal computer (PC) 104 and a telephone 105. WAN network 102 has a network backbone 115 extending there through that represents all of the lines, equipment and access points of the Internet network as a whole. Therefore, there is no geographic limitation to practicing the present invention. From user location 103, an Internet session may be established between PC 104 and a Web server (WS) 116, for example, over Internet backbone 115. In one embodiment, PC accesses Internet 102 via an Internet access line 106 using PSTN 101 and an Internet Service Provider (ISP). This case would reflect dial-up Internet access. Other methods of access are possible and are contemplated for this example like cable/modem access, satellite access through Web television, integrated services digital network (ISDN) or digital subscriber line (DSL). There are still other embodiments, wherein a user may be part of a network segment like a LAN network wherein the customer may access Internet 102 through the LAN network.

PSTN 101 has a CTI/PBX telephony switch 109 provided therein and adapted as an external routing point for incoming calls destined for center 112. CTI/PBX switch 109 has a direct cable connection to switch 124 within center 112 via a telephony cabling 111. A user operating telephone 105 from user location 103 may place a call to a destination number set up by the seller. A service control point (SCP) 108 is provided to direct the call to the appropriate switch 109 based on destination number identification service (DNIS) or some other protocol or protocols. SCP 108 is connected to telephone 105 via a phone line 107. SCP 108 is connected to switch 109 via a telephone trunk 110. Switch 109 within PSTN 101 is connected to switch 124 within center 112 by a telephone trunk 111.

CTI PBX 124 has an instance of interactive voice response (IVR) software provided therein. Software 134 is used to engage and interact with callers registered at switch 124 for the purpose of soliciting information from the callers to perform internal routing according to caller needs. IVR 134 may be used to help create customer account history that may be stored by the company for later reference.

Call center 112 has a data storage facility 114 that includes a data server (DS) 121, a data repository 122 and a data repository 123. Repositories 122 and 123 are adapted to hold information about customers among other possible types of information that may be maintained by center 112. DS 121 has a LAN connection to LAN 133. LAN 133 also supports an agent station 126 and an agent station 127. Station 126 includes an agent PC 129 and an agent telephone 131. PC 129 within station 126 has direct connection to LAN 133. Telephone 131 is connected to switch 124 using internal telephony wiring (132) in this example. Agent station 127 is adapted similarly to station 126, having a LAN-connected PC 128, and a switch-connected telephone 130. There may be many more agent stations present within center 112 than the two stations illustrated. Likewise there may be automated systems within center 112 as well as live agent stations.

In this embodiment of the present invention, center 112 has an Internet router (IR) 125 installed therein and connected to LAN 133 internally and to Internet backbone 115 via an Internet access line 135. IR 125 enables LAN connected agents to access Internet 102 and also allows customers access to center resources via the Internet. Internet 102 has two Web servers (WS) 116 and 120 illustrated therein and connected to backbone 115. WS 116 and/or WS 120 may be hosted or leased by center 112 as a contact Web server for customer interaction. The company may maintain Web services and center contact information pages in one or more of those servers (WS 116, WS 120) for customers accessing those services or pages over the Internet.

Center 112 maintains a data storage facility 114 supported by LAN 133. Data storage facility 114 includes a data server 121 connected to LAN 133, a data repository 122 accessible to server 121 and a data repository 123 accessible to server 121. In one embodiment, repositories 122 and 123 are combined as one physical repository. In this example, they are illustrated separately for discussion purposes only. Data server 121 has an instance of software (SW) 135a provided thereto and executable thereon. Software 135a has the capability of accessing either repository 122 or 123 and retrieving information. In this case, repository 122 includes information about customers who have accessed the companies Web services in the form of Internet cookies that were issued when those customers visited the Web server or servers hosting those services such as WS 116 or WS 120. Data repository 123 includes information about customers that have interacted with company services via a telephone, the information formatted in the form of a unique telephone cookie (TC).

Data storage facility 114 has a counterpart facility 113 maintained offsite on the Internet possibly by a third party service. Facility 113 has a data server 117, a data storage repository 118, and a data storage facility 119. Facilities 118 and 199 are accessible to data server 117. Data server 117 may be a Web server and is directly accessible over the Internet. Like facility 114 within center 112, repositories 118 and 119 hold information about customer histories. For example, repository 118 contains Internet cookies and repository 119 contains customer telephone cookies. DS 117 has an instance of SW 135b provided thereon and executable thereon. SW 135b has the capability of accessing either repositories 118 or 119 and retrieving information there from in the same fashion as software 135a on DS 121. In this example, SW 135a and SW 135b may communicate with each other and share information.

Both instances of software have a capability of creating a new type of history record combining Web history from one or more Internet cookies and telephone account history from one or more telephone cookies that exist for any particular customer. The new record may be termed an Internet/Telephone cookie or an ITC. The data storage system of the present invention does not have to be duplicated in order to practice the present invention. It is illustrated that way in this example for convenience and for the possible involvement of a third party service to implement the invention with respect to clients that are the companies seeking the combined information to better serve their clients. Center 112 may only have a single data storage system that is accessible to both CTI telephony equipment and to Internet-based servers.

In this example, a user such as one operating PC 104 may go online and may access WS 116 for example. WS 116 may be a customer interaction server maintained or leased by a company also hosting center 112. Specific services offered by the company may be made available through WS 116 including transaction services, interactive help services, download linking services, and so on. Some of those services may be automated services and some of those services may be live interactive services including chat and remote PC control programming. Remote PC access and control programming is often used to help a customer to analyze and fix problems with installed software applications and/or hardware devices, or to conduct a co-navigation session to walk the customer through some Web-based presentation or tutorial. In any case, WS 116 may issue one or more Web cookies during the Web-based interaction.

The PC 104 may then receive one or more of those cookies from WS 116 that are stored on the hard drive of the PC after the session and which will be sent back to server 116 the next time the user accesses the server from PC 104. In addition to generating and sending the Web cookie to PC 104, WS 116 may store its own copy and, according to one embodiment of the present invention, may send a copy to DS 117 running SW 135b for storage in repository 118. During the interaction between PC 104 and WS 116, it may be important to know something of any interaction with the company that the customer may have conducted over the telephone in the past. Therefore, during interaction with the customer, WS 116 may solicit DS 117 to "look" for any telephone history on the customer, provided identification of the customer at the server is sufficient to use search criteria for the customer's telephone account history if available.

In one embodiment, DS 117 may on request from a routing system or a live agent, access repository 119 and pull one or more telephone cookies (TCs) on the customer. In this embodiment, SW 135b may then combine the telephone account data from one or more TCs and current Internet cookie data from one or more ICs into a unique Internet/Telephone cookie (ITC).

The format used for presenting an ITC to a service point is in some cases machine readable and in some cases human readable depending on the nature of the service point. For example, if the interaction between PC 104 and WS 116 is live, like an Instant Message chat session, for example, then an agent operating PC 129 at agent station 126 may be the agent servicing the customer. In this case, the generated ITC is human readable and may be delivered to the agent at station 126 for visible display on PC 129. Therefore, the Internet cookie data and the telephone account data is combined into a single human readable interface like a pop-up screen. In this way, the agent may better service the customer because he has more information about the customer at his disposal.

In another case, consider an automated Web service like a music download service. WS 120 may contain music for sale for customers who are members of a music service. The service may be accessible via Internet Web site and through a telephone network for the purpose of purchasing music. If the customer has a personalized Web page at the server, then he or she is a member and the server will receive a cookie each time the customer accesses the site. The Internet cookie allows the server to identify the customer and retrieve the customer's personal Web page streamlining the process. Assume that a particular music selection of new songs, not yet purchased by the customer through the Web site, is to be made available to the customer each time the customer accesses his or her personal page.

In the case outlined above, the customer may have already purchased one or more of those "new" selections by telephone before accessing WS 120 and may have physically acquired those songs from a source other than server 120. In this case the server may solicit DS 117 running SW 135*b* to "look" for a telephone cookie for the customer stored in repository 119 just before generating the personal Web page for the customer. If one exists, SW 135*b* may combine the data from it with the current Web cookie data and may generate an ITC in a format understood by the HTML generating engine that assembles the page for the customer. The TC data from the ITC informs the server that one or more of the proposed selections have already been acquired by the customer. The engine may then replace those songs that were purchased over the telephone with ones that have not yet been purchased. This example is just one of many possible implementations that can improve customer service. Other business models may have other custom uses for the technology.

Synchronization between facility 113 and facility 114 is handled in near real time by SW 135*a* and SW 135*b* in one embodiment. When a user accesses a Web service through the Internet, for example, it may be the first time the user has visited the site. There is yet no Web cookie available, however, a quick lookup in repository 119 in the present example, can tell whether or not the visitor has any history with the company by telephone. However, before a lookup can be performed to see if the visitor has a TC on record, some piece of information has to be provided to the Web server that is included in the telephone history like a name or an address. Therefore, the actual lookup may not be performed until the visitor initiates a transaction of some kind at the Web interface and provides a needed piece of information that can be used by the service to find any telephone history. In some cases, the visitor may not have any telephone history and has only accessed the company through the Internet. In any case, an Internet cookie is created for the visitor and used thereafter to document the user's Web activities.

If the user then accesses the company using the telephone, for example, telephone 105, IVR interaction using IVR 134 may solicit enough information to create an account. During this interaction, an agent operating at station 126, for example, could send a request to DS 121 to perform a lookup to see if the caller has visited the Web site. The request may also be issued and sent to DS 121 by a routing system. If so, then SW 135*a* may generate an ITC and send the information in a human readable format to the agent at station 126 just ahead of the call transfer to the target destination. Now the agent has a history of the callers browsing behavior at the Web site, depending on the information at hand, the agent can interact with the caller in a more helpful way.

It is important to note herein that if a customer has both a Web history and a telephone history with the company, then the latest ITC that was previously generated based on Internet cookies and unique telephone cookies could be retained in storage and rendered accessible to any service point (Web or telephony) until it is updated again. It is also important to note that either ICs or TCs may be deleted from record when they expire, however basic information such as customer identification and account history may be retained. Using the system of the present invention enables a company to integrate historical data of customers relative to the Web-based service points and the telephony-based service points maintained by the company. The customer may be better serviced then from either medium.

In a simple embodiment, a company manages its own Internet cookie information and telephone cookie information and combines the two data sets into an Internet/telephone cookie (ITC) data set. The ITC data set may be formatted using any suitable coding or markup that may include a variety of existing protocols such as extensible markup language (XML), machine readable code, Java script, or other interpretable coding. However, in an embodiment where a third party provides the service, the customer may elect to have cookie data from a variety of Web sites he or she routinely visits and interacts with to be included in the integration process so that a live agent might have a wealth of Internet-based information available at the time of a service call with a customer.

In a variation of the embodiment where browsing behavior at multiple sites may be tracked by a third party, SW 135(*a,b*) may include an extrapolator program that can interpret and format Web-based cookie data in such a manner that a human operator can easily decipher the customers browsing behavior at all of the sites the customer has "signed on" to the service. Web links, thumbnails, transaction results, and the like may be presented in any logical format and the information may be rendered navigable from the agent station PC. The cookies from various Web-based sources could be replicated at a proxy server and then stored in repositories 118 or 122. In this way, an ITC containing links, pictures and other useful data can be presented just ahead of an incoming call. The ITC could be deleted after a session and then re-ordered at a next session. There are many possibilities. In exchange for cooperation from various Web sites or companies, telephone cookies could be made available to those Web-based service points so that the next time the customer visits one of those sites, transaction information from the customers telephone history could be used to improve customer service in a co-branding fashion of sorts.

Figure 2:
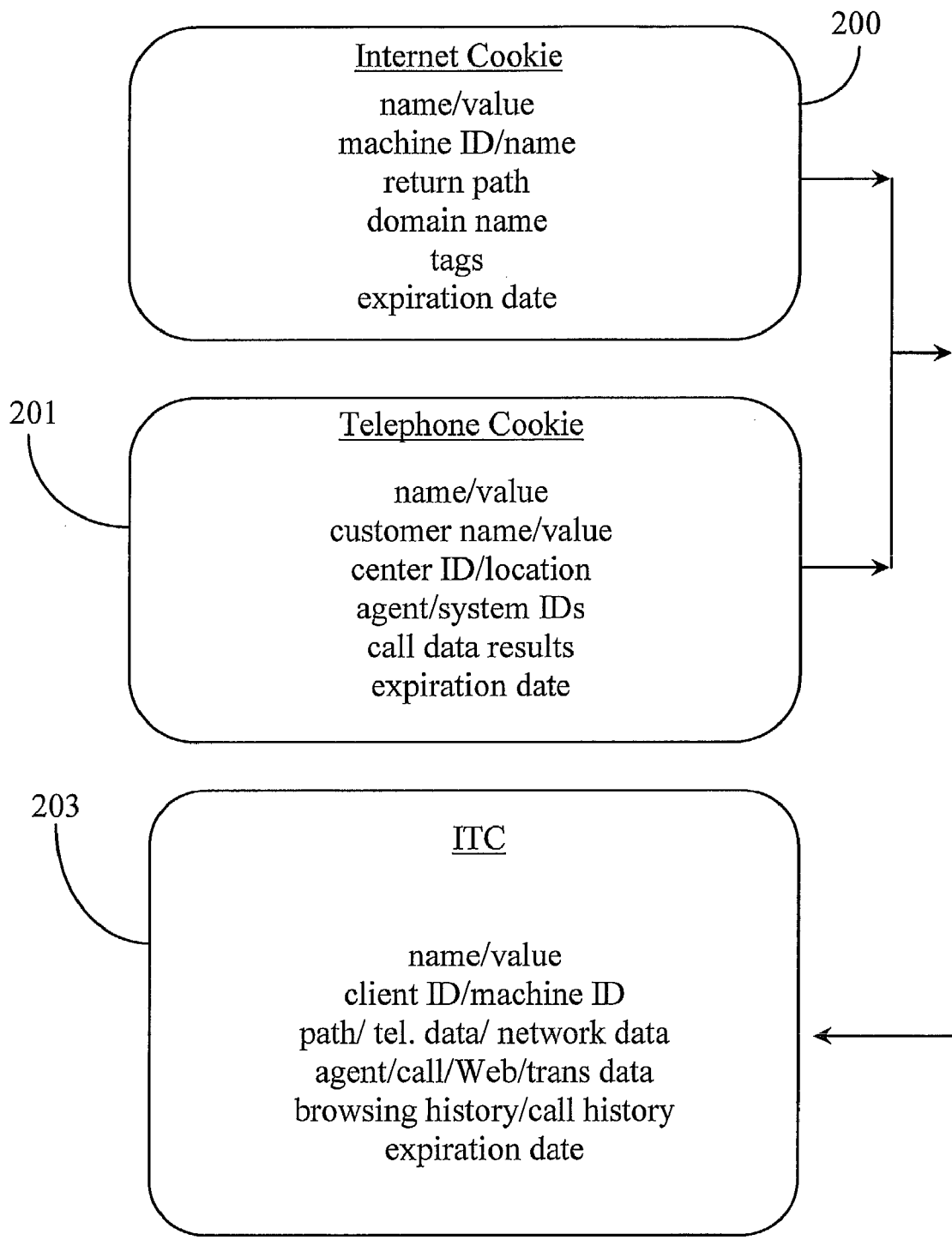
FIG. 2 is a block diagram illustrating components of the software of FIG. 1 according to an embodiment of the present invention.

FIG. 2 is a block diagram illustrating integration of Internet cookie data and telephone account data by software 135*a* and 135*b* of FIG. 1 according to an embodiment of the present invention. Software 135(*a,b*) can retrieve an Internet cookie 200, a telephone cookie 201, and can generate an Internet/Telephone cookie (ITC) 203 for presentation to a live agent or to an automated system. Internet cookie 200 may include a cookie name and value, and the machine identification/address and name of the computer, for which the cookie was generated. Internet cookie 200 includes the return path to the site that generated it, the domain name of the site, any tags to additional data, and an expiration date for that cookie.

A telephone cookie 201 is illustrated somewhat in the same form as internet cookie 200. It has a name and value, a customer name and value, and the location and identification of the center that took the call. Cookie 201 may also include the identification of agents or systems involved in handling the call, any transaction results obtained during the call, and an expiration date.

An ITC 203 may be any combination of the Web-based and telephone-based data. It has a name and value, the identification of the client (name) and client machine (IP address/machine name). It includes the return path to the Web site, telephone data and network data. Further information may include agent/system identification, call data, Web data, transaction data, browsing history, call history, and an expiration date. In some embodiments there is no expiration date and the ITC is regenerated if both a Web cookie and a telephone cookie are available at the next interaction event and the old ITC is deleted from system memory.

It is noted herein that in one embodiment, Internet cookies may be issued and updated throughout a Web session such that if an ITC is generated, all of the data from all of the cookies is included without replication of redundant data such as a same machine name for example. In some cases a fresh Web cookie is generated for each new transaction or interaction and in other cases a same cookie is simply updates with additional data as interaction and transacting ensues during a session. It is important to note that some information about the client will be the same for each type of data set (Internet cookie/telephone cookie) and that common information can be used to verify the existence of the other cookie using a secure network link protocol such as secure socket layer. Once a client has a rich history both on the Web and at the call center, searching the latest data is much easier because more information is known.

It will be apparent to one with skill in the art that the methods and apparatus of the invention may be provided using some but not all of the components described so far without departing from the spirit and scope of the present invention. For example, only one data facility is required to practice the present invention as long as it may be accessed from the Internet and by the call center LAN.

Figure 3:
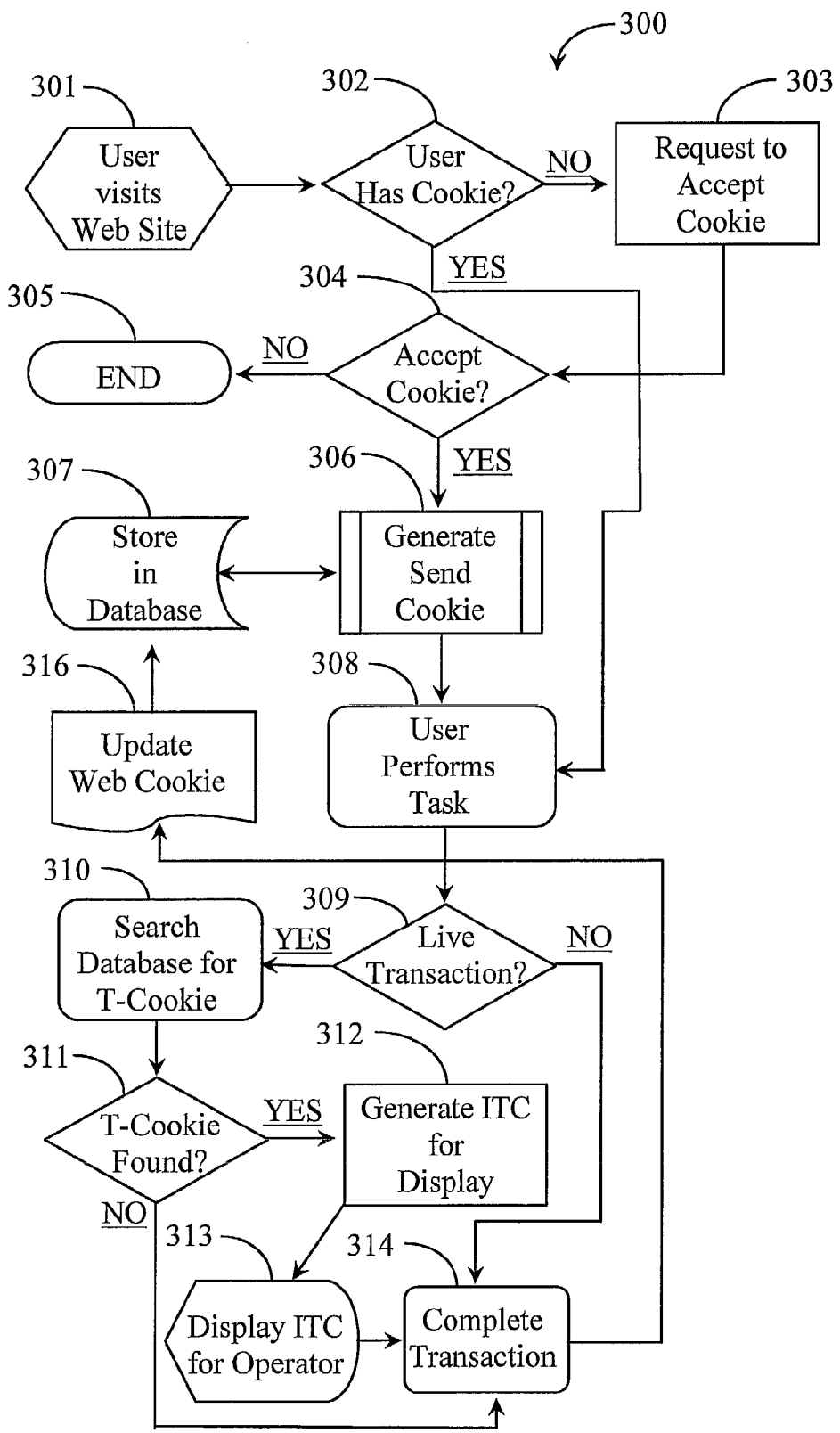
FIG. 3 is a process flow chart illustrating acts for integrating Web and telephone account history during a Web session according to an embodiment of the present invention.

FIG. 3 is a process flow chart illustrating acts 300 for integrating Web and telephone account history during a Web session according to an embodiment of the present invention. At act 301, a user visits a Web site of a company practicing the present invention. At act 302, the Web server determines if the user has returned a cookie previously issued. If not, at act 303, the server requests that the user's browser accept a cookie. It is possible that the visiting user has instructed his browser not to accept cookies. So at act 304 if the cookie request is denied, then the process may end at act 305.

If at act 304, the user's browser is set to accept cookies then at act 306, the server generates and sends a cookie to the user stores a copy of the cookie generated in a server database in act 307. At this point, the user has a cookie, however, the cookie may not have enough data by itself to further identify the user as a past telephone customer that has a current telephone cookie. Therefore, at act 308, the system waits for the user to initiate and perform a task such as ordering a product or performing some other task that would require submission of more personal information. Regardless of the level of information that is obtained from the user, any browsing or other simple task performance may result in the system appending or updating the original cookie in act 316, which the server may then store in the server database at act 307. In one embodiment, more than one cookie may be generated depending on the complexity of the site. This process may repeat itself multiple times before any significant transaction begins.

At act 309, it is determined whether the task will involve a live transaction. The order of the process may change significantly based on the nature of the Web service or the exact interaction that the user will engage in at the site. For example, if the user is going to chat with a service representative, then it may be important that the service agent have an ITC if one can be generated. On the other hand an automated download of a free sample of software may not warrant a lookup to see if more information about the user is available. Therefore, at act 309 if the transaction is not a live transaction, then the process may skip over to act 314 where the transaction is completed. After the transaction has completed in act 314, the Web cookie may be updated to reflect the latest activity. The process may resolve back to act 307 (storing the cookie). In some cases, a new cookie may be generated and sent to the user in act 306. The process may end there if the user disconnects without performing any other task.

If in act 309, the user is initiating some live transaction, then the system may request a lookup of a database analogous to database 123 of FIG. 1 for the existence of one or more telephone cookies. Like Internet cookies, there may be more than one telephone cookie in the database for a user. Likewise, there may be a single telephone cookie that is updated every time the user calls in to the call center. The request may be from the Web server to a data server DS managing the data repositories. In one embodiment, the Web server may actually perform the lookup if it has the software and access to the repositories.

At act 311 the system determines if there is a telephone cookie in the database for the customer. It is likely that the search criteria for the lookup will be a piece of information contained in the telephone cookie like the customer's telephone number. Other pieces of information may be used to correlate the data sets. If the connection is secure then a part of a credit card number or a social security number might be used. It is possible that the customer has not contacted the call center in the past and has no telephone cookie set in storage. If this is the case, the process may skip over to act 314 in which the current transaction is completed.

If however, there is a telephone cookie found for the user in act 311, in act 312 the system may generate an Internet/telephone cookie (ITC) for display, in this case, in a human readable format. The generated ITC is then sent to the agent hosting the live interaction and the ITC for the customer displays on the agent PC. The display may be a pop-up window. In act 314 then, the operator may complete the transaction with the benefit of additional information provided by the telephone cookie data. In any case after a transaction has completed, the process may resolve back to cookie update and storage. This may include resending the cookie to the PC of the user. In some cases a new cookie will be generated that overwrites the previous cookie set.

It will be apparent to one with skill in the art that the process of requesting a lookup for a telephone cookie does not depend on a pending live transaction. In some applications, it may be desirable to obtain more information to help a user select, for example, from a list of options. To illustrate possible machine intelligence that may arise from this process, consider that the user is downloading an application for the PC, but does not know the operating system he or she is running. Automated software on the server may detect that the user is running Windows™ 2000. However, the telephone cookie for the user may indicate a recent purchase of Windows™ XP the user intends to install. The system may, after consulting the telephone cookie data, ask the user before recommending the software version if he or she will replace the current operating system with a Windows™ XP on the accessing computer. If so then the system may recommend the Windows™ install be completed on the accessing computer before downloading any software from the site. The example just given is just one of many scenarios where having telephone account history may help a system or a Web operator to better serve a customer.

It will also be apparent to one with skill in the art that there may be more or fewer acts 300 included in the process and that some acts may be added or subtracted from the process depending on the scenario, the nature of interaction with the Web site and possibly other factors. For example, in state-of-art telephone systems, information regarding the satisfaction level or mood of the customer may be captured during the telephone interaction. That data may then be included in a telephone cookie. If a Web service discovers this information while processing an online transaction, for example, some program option may be in place that enables the service to offer some condolence or discount for the inconvenience the customer had recently experienced on the telephone. There are numerous possible applications.

Figure 4:
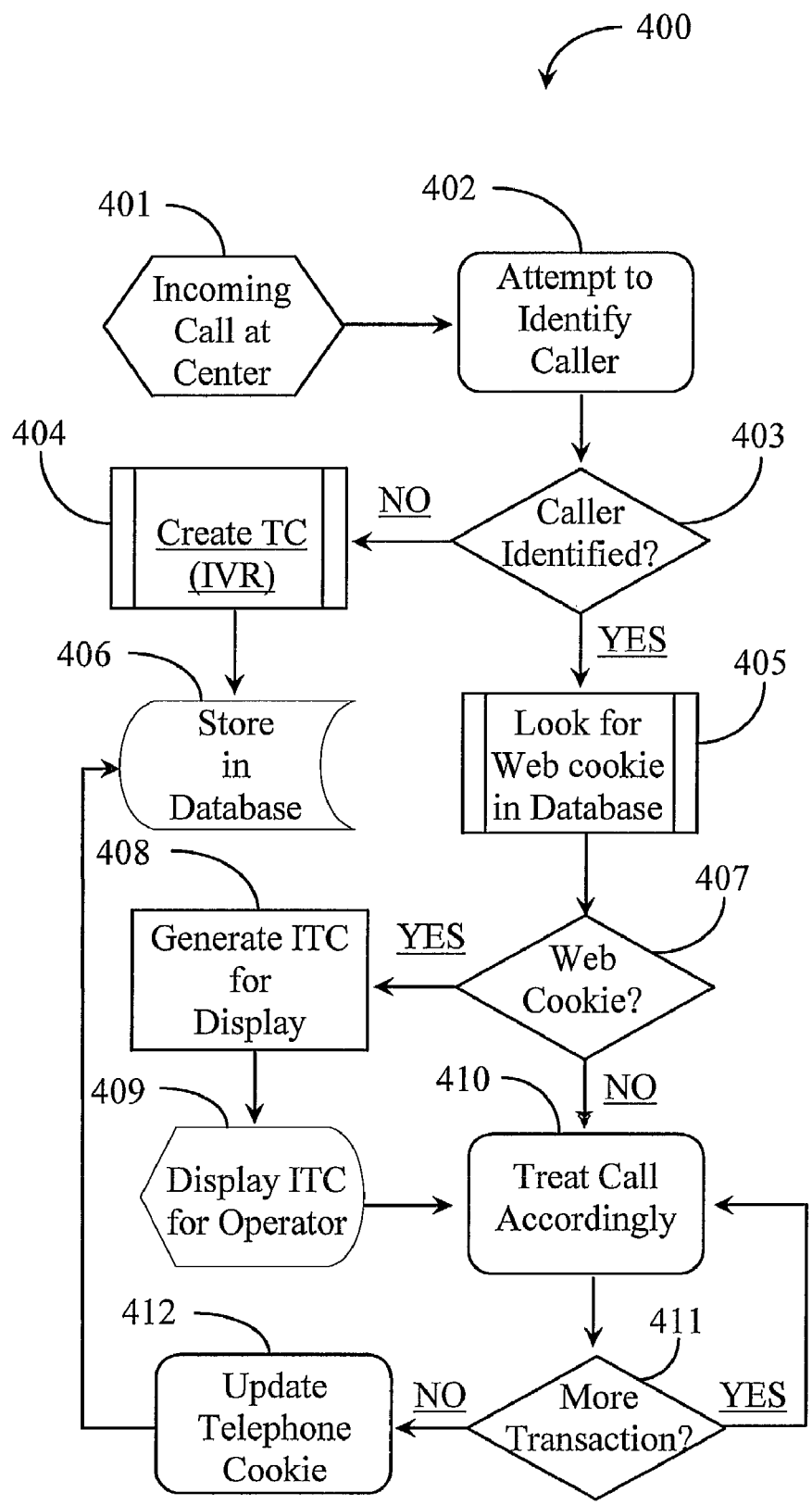
FIG. 4 is a process flow chart illustrating acts for integrating Web and telephone account history during a telephone session according to an embodiment of the present invention.

FIG. 4 is a process flow chart illustrating acts for integrating Web and telephone account history during a telephone session according to an embodiment of the present invention. At act 400, in incoming call enters the call center for routing. At act 402, the system attempts to identify the caller using the current information associated with the call event by performing a lookup to see if the caller has an account with the company.

At act 403, if the caller is not identified as a previous customer, then the caller has no telephone cookie. In that case, in act 404, the system aided by an interactive voice response (IVR) unit solicits information to create an account and telephone cookie for the caller. At act 406, the telephone cookie is stored in a database like database 123 of FIG. 1. Once the caller has a telephone cookie, the process resolves back to act 403 where the caller now is positively identified. If at act 403, the caller is identified, then the caller has a telephone cookie and the process moves to act 405 to determine if the caller also has a Web cookie stored in a database analogous to database 122 of FIG. 1.

In act 407, the system determines if a Web cookie was found for the caller. In the case of the caller interaction first taking place at a telephony switch like CTI/PBX 124 running IVR SW 134, then the CTI switch may user IR 125 to contact DS 121 to request the lookup. The architecture may vary according to the design and capabilities of the call center. If there is a Web cookie found for the caller, then in act 408, the system may generate an ITC for display on a target agent's PC along with the current telephone account data whether just created or already in the system.

At act 409, the ITC is sent just ahead of the routed call to the target agent that is selected by the routing system to handle the call. The ITC may display as a pop-up window with HTML tags, text data, thumbnail links, or other information that would be immediately useable to the operator during the pending call with the customer. At act 410, the agent treats the call accordingly with the benefit of having the caller's Web browsing and interaction history at his fingertips. Having the information readily available in the context of a telephone call may enable faster and better service shortening the time of the call and freeing the agent up to handle more calls than would otherwise be possible. One example of system intelligence that may arise from practicing the invention might be that a caller who is placing a telephone order for a pool pump, but has no idea of the volume of water his pool, recently purchased online holds. The available Web cookie found for the caller may indicate the Web data about the transaction for the pool including model number, capacity, etc. The agent may be able to retrieve a graphic from the Website or go directly to the Website based on data contained in the ITC.

After the call is successfully treated in act 410, the system, or the agent determines if there are any other transactions to be performed at act 411. If not, the system updates the telephone cookie at act 412 and the process resolves back to act 407 to store the updated cookie. If at act 411 there are more transactions required, then the process may resolve back to act 410 for treating call accordingly. In some cases, a new transaction may require some internal transferring or rerouting of the call. In that case, the current ITC data may be tagged to the call event and may be displayed including the TC update information for the next agent. In the case of an automated treatment system handling the next transaction, a machine readable version of the ITC data may be forwarded to the system and interpreted by the system if necessary. There are many possibilities.

One with skill in the art will appreciate that the process of interaction from a telephony perspective is different than the process of interaction from a Web perspective and that the processes will differ somewhat because of the differing architecture and interaction capabilities described.

Figure 5:
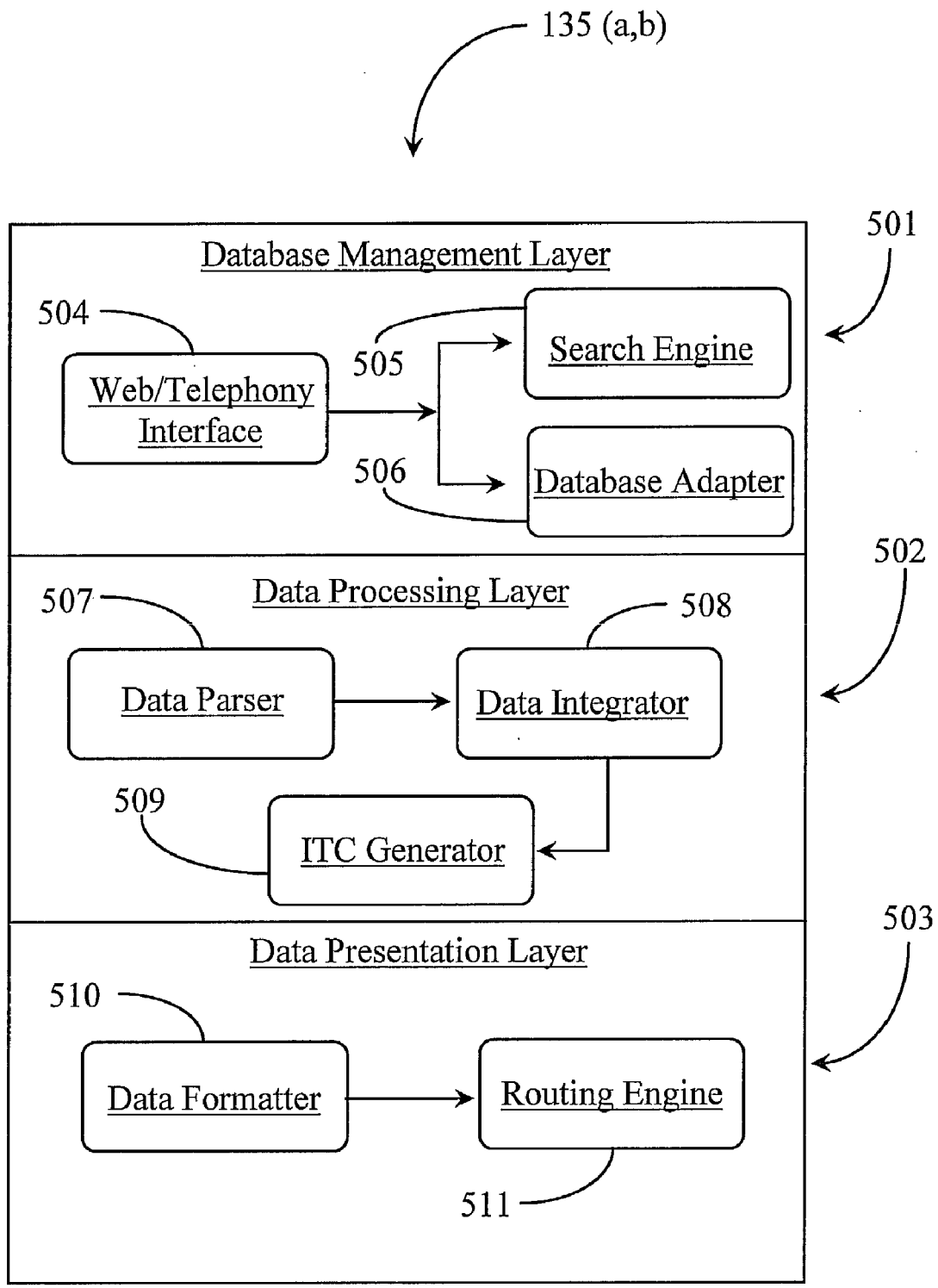
FIG. 5 is a block diagram illustrating basic components of software 135(a,b) according to an embodiment of the present invention.

FIG. 5 is a block diagram illustrating basic components of software 135(*a,b*) of FIG. 1 according to an embodiment of the present invention. SW 135(*a* or *b*) may run on a data server such as DS 121 or DS 117 as was described earlier. For the purpose of this example, SW 135(*a,b*) will be referred to as simply SW 135 in this example. In actual practice, however SW 135 may differ slightly in version and capability depending on the location of installation and the nature of the equipment it resides on.

In this example, SW 135 has 3 basic functional layers. A database management layer 501, a data processing layer 502, and a data presentation layer 503. Database management layer 501 contains all of the components required to manage the data stored in one or more repositories. The basic components include a Web and/or Telephony system interface 504 adapted to enable the host server running the software to communicate with Web servers or telephony servers to receive data from them and to send data to them. For example, when a cookie is generated and stored for a customer a replicated version of the cookie may, in one embodiment be sent to and received by SW 135 for the purpose of storing the cookie in the connected repository. In one embodiment, a CTI telephony server may also send its version of a cookie created for a new caller to SW 135 for storage. Layer 501 includes a data search engine 505 in this example. Search engine 505 is adapted to perform data lookups based on keyword or query. In this way customer cookies stored in the repository may be located and retrieved for processing.

Data processing layer 502 is responsible for processing raw data from the repository to generate a combined or combination record reflecting the data history of both the customers Web interactivity and his telephone interactivity with the call center. Processing layer 502 includes a data parser 507 that functions in this embodiment as a cookie reader. Parser 507 may be assumed to be equipped to parse raw cookie data according to at least one set of rules with aid from a library (not illustrated) containing the required scripts and vocabulary that the parser requires to read specific data formats generic to the raw data sets.

A data integrator 508 is provided within layer 502 and is adapted to integrate data from two or more separate records passed by parser 507 to provide a combined raw data set that is streamlined by eliminating any redundant or repeated data in the records. An ITC generator 509 is provided within layer 502 and is adapted to generate a finished ITC that contains data retrieved from both Web and telephone cookie data.

SW layer 503 of SW 135 is a data presentation layer. Layer 503 includes a data formatter 510 adapted to format the raw data of the combined record into some useable format depending on specific conditions. For example, formatter 510 may format raw data into a machine readable code for an automated system. In another embodiment, formatter 510 may format the data for human operators. Formatting may include formatting the data itself and also formatting the exact way that the data will be organized and displayed. A routing engine 511 is provided within presentation layer 503 and is adapted to enable the server to route newly created ITCs to appropriate agents or systems connected to the network. SW 135 may also talk to other instances of SW 135 for the purpose of data synchronization with other data storage locations. For example, an online data storage facility may sync data with a LAN facility and so on. Data synchronization may be periodic or near real time as both the facilities receive data for storage. There are many possibilities.

One with skill in that art of managing data will understand that duel storage facilities are not absolutely required in order for a telephone call center, for example, to practice the invention. Illustration of duel facilities with respect to the example of FIG. 1 merely reflects a convenience in practicing the invention. Only one facility is required in order to practice the invention. It will also be apparent to one with skill in the art of software/hardware implements that there may be other dedicated components provided to aid in the practice of the present invention. For example, data buffers, queues, rules base modules, vocabulary applications, application extensions to bridge conflicting operating systems and the like may be assumed present in the aggregate or in part in some embodiments. The SW of the present invention relies on server processing capabilities and network communication ports and buffer circuitry to accomplish various tasks.

The methods and apparatus of the present invention may be used in conjunction with a wide variety of bridged communication networks. The SW may be implemented on a wide variety of machines including Web-based machines and CTI/telephony machines. In some cases, browser plug-in downloads may be provided for customers who participate in the system according to some embodiments. For example, in one embodiment, instead of obtaining Web cookies through the Web server, a browser plug in may enable a customer to send copies of cookies received on the customers PC to the server responsible for storing those for later access. The spirit and scope of the present invention should be afforded the broadest interpretation under examination in light of the many embodiments described. The present invention shall only be limited by the claims presented below.

What is claimed is:

1. A system facilitating interaction between a customer and an enterprise, comprising:
   a computerized service interface hosted by the enterprise for supporting a live interaction with the customer connecting to the system via a communication device;
   a data server coupled to the computerized service interface, the data server executing a software instance; and
   at least one data repository at the enterprise accessible to the data server, the data repository storing a telephone interaction history cookie file for each call between the customer and the enterprise and a separate web-browsing interaction history cookie file for each Web-browsing contact between the customer and the enterprise;
   wherein, as a result of receiving a live interaction for the interface from the customer, upon request either from the interface, or from a router enabled to route the live transaction to the interface, the data server retrieves one or more of the telephone transaction history cookie files and one or more of the web-browsing history cookie files, combines the telephone and Web-browsing history cookie files into a single history cookie file associated with the customer, and provides the single cookie file to the computerized service interface.

2. The system of claim 1, wherein the computerized service interface enabled to support a live interaction with the customer is a computerized workstation manned by a live agent, and the live interaction is a voice or text interaction between the customer and the live agent.

3. The system of claim 2, wherein the live interaction is one of a chat session, a text message interaction, or a voice call.

4. The system of claim 1, wherein the computerized service interface is a Web interface and the live interaction is an interaction by the customer at a web site hosted by the enterprise.

5. The system of claim 4, wherein the single cookie file is machine readable.

6. The system of claim 3, wherein the single cookie file is human readable and displayable on a PC screen.

7. The system of claim 1, wherein the request is made by the router, and the arrival of the single cookie file at the service interface is prior to receiving the live interaction routed to the interface.

8. A method facilitating interaction between a customer and an enterprise, comprising the steps of:
   (a) creating and storing, by an instance of software executing from a database at the enterprise, a telephone interaction history cookie file for each call between the customer and the enterprise;
   (b) creating and storing, by the software, a web-browsing interaction history cookie file for each Web-browsing contact between the customer and the enterprise;
   (c) receiving a live interaction from the customer via telephone call or Web-browsing contact at a routing server routing calls and web-browsing contacts to a computerized service interface at the enterprise;
   (d) receiving a request for the stored interaction history from the computerized service interface enabled to support a live interaction with the customer connecting to the interface via a communication device, or from the router;
   (e) retrieving and sending to the interface, as a result of the request, a single cookie file combining at least one of the stored telephone interaction history cookie files and at least one of the web-browsing history cookie files associated with the customer, wherein the combined cookie file is received at the interface prior to receiving the telephone call or Web-browsing contact.

9. The method of claim 8, wherein the computerized service interface enabled to support a live interaction with the customer is a computerized workstation manned by a live agent, and the live interaction is a voice or text interaction between the customer and the live agent.

10. The method of claim 9, wherein the live interaction-is one of a chat session, a text message interaction, or a voice call.

11. The method of claim 8, wherein the computerized service interface is a Web interface and the live interaction is an interaction by the customer at a web site hosted by the enterprise.

12. The method of claim 11, wherein the single cookie file is machine readable.

13. The method of claim 11, wherein the single cookie file is human readable and displayable on a PC screen.

14. The method of claim 8, wherein the request is made by the router, and the arrival of the single cookie file at the service interface is prior to the interaction routed to the interface.

* * * * *